United States Patent [19]

Dohner

[11] Patent Number: 5,045,119

[45] Date of Patent: Sep. 3, 1991

[54] TELEPHONE CABLE CLEANING AND RESTORATION FLUID

[75] Inventor: Brent R. Dohner, Conroe, Tex.

[73] Assignee: Pennzoil Products Company, Houston, Tex.

[21] Appl. No.: 581,215

[22] Filed: Sep. 11, 1990

[51] Int. Cl.$^5$ .......................... B08B 9/03; C09D 9/00
[52] U.S. Cl. .................. 134/22.11; 134/22.12; 134/22.14; 134/22.18; 134/22.19; 134/39; 134/40; 252/170; 252/171; 252/172; 252/540; 252/DIG. 8
[58] Field of Search .................. 134/22.1, 22.19, 39, 134/40, 22.11, 22.12, 22.14, 22.18; 252/162, 540, 544, 545, 549, 554, 558, 170, 171, 172, 174.15, 174.23, DIG. 8

[56] References Cited

U.S. PATENT DOCUMENTS

| | | |
|---|---|---|
| 1,766,714 | 6/1930 | Lenin et al. .......................... 117/231 |
| 3,252,834 | 5/1966 | Vincent .............................. 117/231 |
| 3,511,708 | 5/1970 | Zisman et al. . |
| 3,673,097 | 6/1972 | DeVroome . |
| 3,856,534 | 12/1974 | Fletcher et al. . |
| 3,953,381 | 4/1976 | Remond et al. . |
| 4,303,558 | 12/1981 | Hey . |
| 4,368,133 | 1/1983 | Forsberg . |
| 4,372,988 | 2/1983 | Bahder . |
| 4,766,011 | 8/1988 | Vincent et al. . |
| 4,783,226 | 11/1988 | Senu . |
| 4,808,329 | 2/1989 | Soldanski et al. . |

FOREIGN PATENT DOCUMENTS

| | | |
|---|---|---|
| 0220320 | 3/1985 | German Democratic Rep. . |
| 0220321 | 3/1985 | German Democratic Rep. . |
| 0220322 | 3/1985 | German Democratic Rep. . |
| 0247693 | 7/1987 | German Democratic Rep. . |

Primary Examiner—Paul Lieberman
Assistant Examiner—William S. Parks
Attorney, Agent, or Firm—Lowe, Price, LeBlanc & Becker

[57] ABSTRACT

Formulations for cleaning and restoring electrical cable which include a water-displacing additive, a water-proofing additive and a solvent. The formulations are particularly useful for cleaning and restoring electrical properties to paper insulated cables.

7 Claims, 1 Drawing Sheet

TREATED

UNTREATED

TREATED

UNTREATED

5,045,119

TELEPHONE CABLE CLEANING AND RESTORATION FLUID

TECHNICAL FIELD

The present invention relates to treating formulations for cleaning and restoring electrical cables and methods for cleaning and restoring electrical cables. In particular, the present invention relates to treating formulations and methods for cleaning and restoring electrical cables which contain paper insulation.

BACKGROUND ART

Electrical cables customarily comprise one or more conductors surrounded by an insulating medium, and a protective sheath. Such cables are used for the transmitting of electrical power and in the transmission of communications signals. Power cables have relatively few conductors of heavy gauge which are insulated for high voltages. Communications cables usually contain many pairs of small gauge, paper insulated copper conductors, surrounded by an external lead or plastic sheath. The various pairs of conductors are arranged by twisting and placement to minimize pick-up, i.e., cross talk, between them.

In recent years, wide use has been made of underground cables for the transmission both electrical power and communications. Aside from the obvious aesthetic advantages provided by underground power distribution and communications networks, such underground placement of cables offers relative immunity from damage due to environmental factors such as lightening, high winds and ice formation.

One of the problems realized in maintaining the many miles of underground cable which have been laid over the years is that of water intrusion, corrosion and galvanic action which takes place due to the presence of dissimilar metals in the cables. These actions produce undesirable electrical shorting of the cable pairs in the cable core and cause noise, interference and cross-telephone conversations in the telephone lines which are served by the cable.

Various techniques have been proposed to alleviate problems caused by water intrusion including pumping of liquids and gases, such as air and nitrogen through the cables to clear the cable of water and dry the telephone cable pairs.

Various types of compounds such as copper sulfate and sulfuric acid are formed in the cables over time. Subsequent water intrusion reacts with these compounds and results in changes the capacitance of the cable, which increases the noise level in telephone conversations. This problem is further complicated by the fact that many core cables include an outer plastic sheath, an intermediate liner constructed of a metal such as copper, aluminum or steel metal and optional plastic liners, which contains the cable pairs. Under circumstances wherein the inner plastic sheath is worn, pitted or otherwise damaged thus facilitating water intrusion into the metal jacket, or wherein no plastic inner sheath is placed in the cable, the copper, aluminum or steel oxidizes and forms compounds which are detrimental to the life and service of the cable pairs located in the cable.

A number of methods have been proposed to protect or restore underground cables which have been damaged due to water intrusion. Bahder, U.S. Pat. No. 4,372,988 and Vincent et al, U.S. Pat. No. 4,766,011 teach similar methods of protecting underground cables which involve supplying the cables with solutions which basically fill-in and seal voids in the cable where water might leak into the cable.

Vincent et al, U.S. Pat. No. 3,252,834 discloses a preservative treatment for electrical cables wherein a liquid mixture of varnish, silicone resin and a suitable solvent are pumped through a section of an underground so that the varnish coats the interior of the cable and conductor insulation.

A more recent underground cable treatment method is disclosed by Senn in U.S. Pat. No. 4,783,226. This patent discloses an apparatus which is used to sequentially pump air and treating liquid through a sealed off portion of the cable. The treating liquids used in this patent include low viscosity, light demoisturizing insulating and cleaning oils which were specifically selected to clean and restore plastic insulated cables.

It has subsequently been discovered that the prior art cable cleaning and restoration liquids are suitable for use in conjunction with plastic insulated cable, but are unsuited for use in conjunction with paper insulated cable. A major disadvantage discovered which makes the prior art cleaning and restoration formulation unacceptable for use in conjunction with paper insulated cables is that the low viscosity components conventionally used include hydrocarbon oils which leave residues on the paper insulation which render the insulation too conductive for proper use.

The cleaning and restoration formulations of the present invention are a substantial improvement over the prior art which allow for cleaning and restoration of paper insulated cables without imparting appreciable conductivity to the paper insulation.

DISCLOSURE OF THE INVENTION

It is accordingly one object of the present invention to provide cleaning and restoration formulations for electrical cables.

It is a further object of the present invention to provide cleaning and restoration formulations for paper insulated electrical cables, including communication cables.

It is another object of the present invention to provide cleaning and restoration formulations for electrical cables which includes a unique combination of a water-displacing agent, a water-proofing agent and a non-conducting solvent.

It is a still further object of the present invention to provide for a method of cleaning and restoring electrical cables which utilizes the above novel cleaning and restoration formulations.

It is a still further object of the present invention to provide for a method for cleaning and restoring paper insulated electrical cables, including underground electrical communications cables.

According to the present invention there are provided novel electrical cable cleaning and restoration formulations which include a water-displacing agent, a water-proofing agent and a non-conducting solvent.

The present invention further provides a method of cleaning and restoring electrical cables in which the cleaning and restoration formulations are passed through a cable to thereby displace water, water-proof the interior of the cable and restore electrical properties to the cable.

BRIEF DESCRIPTION OF DRAWINGS

The present invention will now be described with reference to the annexed drawing, which is given by way of a non-limiting example in which.

BEST MODE FOR CARRYING OUT THE INVENTION

Figure 1:
FIG. 1 is a magnified view of untreated paper insulation and paper insulation which has been treated with the cleaning and restoration formulation of the present invention.

The present invention is directed to cable cleaning and restoration formulations which including a water-dispersing agent, a water-proofing agent and a non-conductive solvent. In a preferred embodiment the present invention is directed to a cleaning and restoring formulation which includes between about 30 and 99 wt.% of a non-conducting solvent, between about 0.1 and 50 wt.% of a water-proofing additive and between about 0.1 and 20 wt.% of a water-displacing additive. In a more preferred embodiment the formulation includes between about 80 and 98 wt.% solvent, between about 1 and 10 wt.% of a water-proofing additive and between about 1 and 10 wt.% of a water-displacing additive. In a most preferred embodiment the formulation includes about 92 wt.% solvent, about 4 wt.% of a water-additive and about 4 wt.% of a water-displacing additive.

The present formulations were developed to clean and restore electrical cables. In this regard, cleaning includes displacing water or moisture as well as metal oxides and metal salts formed within the cable over time. Restoration includes water-proofing the interior of the cable and impregnating the insulation within the cable so as to plasticize the insulation. Restoration moreover includes restoring the electrical properties of the cable, particularly resistivity.

The solvents used in the present formulations are characterized as those in which non-conducting, water-proofing additives such as silicone fluids are soluble. Table 1, below lists solvents which have been determined to be useful for purposes of the present invention.

TABLE 1

|  | Evap. Rate* | Fl. Pt. °F. TCC |
|---|---|---|
| ALIPHATIC SOLVENTS | | |
| Pentane | 1.0 | <0 |
| Rubber Solvent | 3.1 | <0 |
| Hexane | 1.9 | <0 |
| Cyclohexane | 3.4 | 0 |
| LACOLENE ® | 3.5 | 20 |
| Super LACOLENE ® | 25 | |
| Heptane | 2.9 | 25 |
| VM & P Naphtha | 9.2 | 52 |
| 90 Solvent | 24.5 | 90 |
| KWIK DRI ® | 36 | 105 |
| Rule 66 Mineral Spirits | 70 | 105 |
| Odorless Mineral Spirits | 90 | 128 |
| 140 Solvent | 151 | 140 |
| 529 Solvent | Above 200 | 145 |
| Low Odor Base Solvent | Above 200 | 145 |
| Mineral Seal Oil | Above 200 | 265 |
| KETONES | | |
| Acetone | 1.9 | −4 |
| Methyl Ethyl Ketone | 2.7 | 24 |
| Methyl Propyl Ketone | 4.8 | 46 |
| Methyl Isobutyl Ketone | 5.6 | 61 |
| Mesityl Oxide | 8.2 | 80 |
| Methyl Isoamyl Ketone | 17 | 96 |

TABLE 1-continued

|  | Evap. Rate* | Fl. Pt. °F. TCC |
|---|---|---|
| Diacetone Alcohol, A.F. | 60 | 120 |
| Methyl Amyl Ketone | 22 | 102 |
| Cyclohexane | 41 | 112 |
| Diisobutyl Ketone | 31 | 120 |
| Isophorone | Above 200 | 180 |
| AROMATIC SOLVENTS | | |
| Toluene | 4.5 | 45 |
| Ethyl Benzene | 8.8 | 79 |
| Xylene | 9.5 | 80 |
| HI-SOL ® XB | 50 | 105 |
| HI-SOL 10 | 27 | 110 |
| HI-SOL 70 | 56 | 112 |
| HI-SOL 15 | 116 | 140 |
| ESTER SOLVENTS | | |
| Ethyl Acetate 99% | 2.7 | 26 |
| Isopropyl Acetate 99% | 3.0 | 47 |
| n-Propyl Acetate | 4.8 | 55 |
| Isobutyl Acetate | 5.8 | 63 |
| n-Butyl Acetate | 8.2 | 81 |
| Glycol Ether EM Acetate | 21 | 120 |
| Amyl Acetate (primary) | 15 | 101 |
| Isobutyl Isobutyrate | 15 | 101 |
| Glycol Ether EE Acetate | 32 | 130 |
| Glycol Ether EB Acetate | 137 | 160 |
| 2-Ethylhexyl Acetate | 150 | 160 |
| Glycol Ether DE Acetate | Above 200 | 235 (a) |
| Glycol Ether DB Acetate | Above 200 | 240 (a) |
| CHLORINATED SOLVENTS | | |
| Methylene Chloride | 1.8 | |
| Chloroform | 1.9 | |
| 1,1,1-Trichlorethane | 2.6 | |
| Carbon Tetrachloride | 2.0 | |
| Ethylene Dichloride | 3.3 | |
| Trichlorethylene | 3.1 | |
| Propylene Dichloride | 3.7 | |
| Perchlorethylene | 6.0 | |
| Monochlorbenzene | 6.0 | |
| Dichlorobenzene | 38.5 | |
| VOLATILE CYCLIC SILICONES | | |
| General Electric | | |
| SF 1173 | | 130 |
| SF 1202 | | 170 |
| SF 1204 | | 140 |

*Ethyl Ether 1
(a) C.O.C.

These solvents listed in Table 1 are generally suitable for purposes of the present invention. Of the above listed solvents the more preferred are those which are non-flammable, i.e. have flash points above 100° F., and are substantially volatile, i.e. have evaporation rates between about 1 and 150, as indicated above. From an environmental and safety view, the preferred solvents include mineral spirits, i.e., petroleum solvents, with flash points of 140 or above. In this regard, perferred solvents include naphthas.

The water-proofing additive can be any nonconductive additive known as being useful for waterproofing paper such as silicone based compounds or fluorinated organic compounds. Preferred waterproofing additives are silicone fluids such as those available commercially from Dow Corning or General Electric.

The water-displacing additive can be any carboxylate, sulfonate, amide, imide, ester or other compound known to displace water from a paper surface. Preferred water-displacing agents comprise the combination of at least one nitrogen-containing, phosphorus-free carboxylic solubilizer made by reacting at least one carboxylic acid acylating agent having at least one hydrocarbyl-based substituent of at least about 12 to about 500 carbon atoms with at least one N-(hydroxyl-substituted hydrocarbyl) amine, hydroxylsubstituted poly(- hydrocarbyloxy) analog of said amine or mixtures thereof with at least one surfactant. This type of water-displacing agent and process for making the same is described in U.S. Pat. No. 4,368,133, which is expressly incorporated herein by reference.

The water displacing additive of the invention can be any of the products produced in accordance with any of the working examples of U.S. Pat. No. 4,368,133.

The following examples are presented to illustrate the invention which is not intended to be considered as being limited thereto. In the examples and throughout percentages are by weight and viscosities are in centistokes unless otherwise indicated. The following examples include results from tests conducted during the course of the present invention and illustrate many of features of the present invention.

EXAMPLE 1

Initial testing preformed in this example was directed at optimizing the level of water-displacing additive. 500 ml samples with varying amounts of water-displacing additive were pumped through five foot sections of used, lead sheathed, telephone cable and the drop in resistivity was recorded. This test was developed to simulate treating active telephone cable in which a resistivity drop to 100K can be tolerated without loosing service. The results of this test are presented in Table 2 below.

TABLE 2

| Sample | Solvent | Water-Preventing Additive | Water-Displacing Additive | Resistivity ohms |
|---|---|---|---|---|
| 1 | 95 | 5 | 0 | 2000K |
| 2 | 94 | 5 | 1 | 400K |
| 3 | 93 | 5 | 2 | 150K |
| 4 | 91.5 | 5 | 3.5 | 380K |
| 5 | 90.0 | 5 | 5 | 250K |

From Table 2 it is seen that the water-displacing additive adversely affects conductivity, however, up to 5% water-displacing additive (Alkanolamine Ester), the resistivity drop is still acceptable. It is preferable to balance resistivity drop with water-displacing ability in order to optimize cleaning without impairing service.

EXAMPLE 2

In this example the cables treated with products 1, 3 and 5 in Example 1 were impregnated with 1-2 grams of water, until the resistivity dropped below 50K ohms. This represents a worst case scenario in which the cable will go out of service. A 500 ml sample of the appropriate product was then passed through the cable as in the procedure of Example 1 and the resistivity recovery noted. This test was designed to indicate the water-displacing ability of the formula. The results are given in Table 3 below.

TABLE 3

| Sample | Resistivity (ohms) After Water Impregnation | Resistivity (ohms) After Treatment |
|---|---|---|
| 1 | 26K | 32K |
| 3 | 10K | 30K |
| 5 | 32K | 170K |

As illustrated in Table 3 sample V, with 5% water-displacing additive, showed the largest percent recovery. This indicates that sample V has the potential to restore a completely dead cable.

EXAMPLE 3

In a further test based on this assumption a piece of water-saturated cable was treated with product V and tested as in Example 2 above. As is seen from the data recorded in Table 4, the cable was recovered to a usable state.

TABLE 4

| Initial Resistivity (ohms) | Resistivity After Treatment (ohms) |
|---|---|
| 0 | 280K |

After treatment the lead sheathing was removed from the cable treated with product V and the paper insulated wires were removed. It was observed that the paper insulation seemed tougher in the treated cable.

In order to determine if the treatment harmed the insulating properties of the paper, breakdown strength was tested by passing 120V at 10A across a pair of wires. No breakdown occurred indicating that the insulating ability of the paper was not affected.

The treated paper insulation was observed under a microscope and compared with untreated insulation and a reduction in porosity of the treated paper insulation was observed.

The treated and untreated paper insulation were further examined by x-ray. The silicone oil residue on the treated insulation was easily detected. Interestingly, there were copper and lead, either in salt form or as oxides present in the untreated paper insulation which were removed form the treated insulation.

EXAMPLE 4

In order to optimize the amount of silicone oil, structure and viscosity the following samples listed in Table 5 were tested according to the above procedure in Example 1, in the concentrations indicated.

TABLE 5

| Sample | Solvent | Silicone Oil | Water-Displacing Additive | Resistivity (ohms) |
|---|---|---|---|---|
| 6 | 90 | 5 | 5 | 250K |
| 7 | 89 | 6 | 5 | 750K |
| 8 | 88 | 7 | 5 | 800K |
| 9 | 86 | 9 | 5 | 600K |

In reviewing the data in Table 5 it is noted that at the upper end of the logarithmic scale, there is not much difference between 600K and 800K ohms. From the data in Table 5 it appears that the maximum amount of silicone oil is 6% for this product. Sample 7 then has optimized silicone oil and water-displacement additives.

EXAMPLE 5

In order to examine silicone oil structure, dimethyl, diphenyl and methyl alkyl silicone oils were tested at 5% in a formulation with 5% water-displacing additive and the remainder solvent. The results of this investigation are given in Table 6 below.

TABLE 6

| Sample | (General Electric) Si Oil | Structure | Resistivity (ohms) | Si Oil Cost |
|---|---|---|---|---|
| 10 | SF96-50 | Dimethyl | 250K | 3.34 $/lb |
| 11 | 1023 | Diphenyl | 500K | 18.00 $/lb |

TABLE 6-continued

| Sample | (General Electric) Si Oil | Structure | Resistivity (ohms) | Si Oil Cost |
|---|---|---|---|---|
| 12 | 1147 | Methyl Alkyl | 650K | 15.13 $/lb |

From Table 6 is noted that the diphenyl and methyl silicone oils are more effective than the dimethyl, however much more expensive.

EXAMPLE 6

Finally, in this example dimethyl silicone oils of various viscosities were tested in a similar manner as in the above examples in order to determine the effect of viscosity of resistivity. Since all of the dimethyl silicone oils were basically the same price, the data in Table 7 below indicates that there is a definite advantage to utilizing silicone oils having higher viscosities.

TABLE 7

| (General Electric) Silicone Oil | Viscosity (centistokes) | Resistivity (ohms) |
|---|---|---|
| SF 96-50 | 50 | 250K |
| SF 96-350 | 350 | 270K |
| SF 96-500 | 500 | 340K |
| SF 96-1000 | 1000 | 700K |

Table 7 indicates that SF 96-1000 is the preferred Dimethyl silicone oil.

EXAMPLE 7

In this example tests were conducted to optimize the amount of SF 96-1000 samples containing various amounts of SF 96-1000 were tested. The results of these teste are given in Table 8 below.

TABLE 8

| Solvent | % SF 96-1000 | Water-Displacing Additive | Resistivity (ohms) |
|---|---|---|---|
| 90 | 5 | 5 | 850K |
| 91 | 4 | 5 | 850K |
| 92 | 3 | 5 | 550K |
| 93 | 2 | 5 | 480K |

Form the above information in Table 8 it appears that a optimum formulation for the cleaning and restoration formulation of the present invention is about 91% solvent; about 4% water-proofing silicone oil and; about 5% water-displacing additive. This preferred formulation minimizes the amount of Silicone oil for best cost effectiveness.

EXAMPLE 8

Various water-displacing additives were tested in order to determine those suitable for purposes of the present invention. These water-displacing additives, listed in Table 9 below were tested according to the procedure utilized in the above examples, on water-saturated cables.

TABLE 9

| Water-Displacing Additive | Resistivity Before Treatment | Resistivity After Treatment | Recovery |
|---|---|---|---|
| NONE | 18K | 22K | 4K |
| (Alkanolamine Ester) | 18K | 34K | 16K |
| (Med. MW Sulfonate) | 18K | 26K | 8K |
| (High MW Sulfonate) | 20K | 28K | 8K |
| (Polypropylene Glycol) | 22K | 22K | 0K |
| (K Salt of Rosin Acid) | 20K | 20K | 0K |
| (Ba Salt of Ox Hydrocarbon) | 20K | 38K | 18K |
| (Glycerol Monooleate) | 22K | 32K | 10K |
| (Glycerol Dioleate) | 22K | 32K | 10K |

The above formulations can be utilized to clean and restore electrical cables by passing the formulations through sections of cables. In this regard, the formulations can be advantageously utilized in the apparatus described in U.S. Pat. No. 4,783,226, expressly incorporated herein by reference. These formulations provide for a method of cleaning and restoring paper insulated electrical cables for extended use thereof.

Although the invention has been described with reference to particular means, materials and embodiments, from the foregoing description, one skilled in the art can ascertain the essential characteristics of the present invention and various changes and modifications may be made to adapt the various uses and characteristics thereof without departing from the spirit and scope of the present invention as described in the claims that follow.

I claim:

1. A method of cleaning and restoring electrical properties to electrical cables which comprises passing a cleaning formulation through at least a section of a cable to be treated, said cleaning formulation comprising:
   a water-displacing additive selected from the group consisting of carboxylates, sulfonates, amides, imides, esters and combinations thereof;
   a water-proofing additive selected from the group consisting of silicone based compounds, fluorinated organic compounds and mixtures thereof; and
   a solvent component.

2. A method of cleaning and restoring electrical properties to electrical cables according to claim 1, wherein said cable comprises paper insulated cable.

3. A method of cleaning and restoring electrical properties to electrical cables according to claim 2, wherein said paper insulated cable comprises telephone cable.

4. A method of cleaning and restoring electrical properties to electrical cables according to claim 1, wherein said cable comprises underground or aerial cable.

5. A method of cleaning and restoring electrical properties to electrical cables according to claim 1, wherein said cleaning formulation is passed through said cable by means of gas pressure.

6. A method of cleaning and restoring electrical properties to electrical cables according to claim 1 wherein said formulation comprises between about 0.1 and about 20 weight percent of a water-displacing additive selected from the group consisting of carboxylates, sulfonates, amides, imides, esters and combinations thereof; between about 0.1 and about 50 weight percent a water-proofing additive selected from the group consisting of silicone based compounds, fluorinated organic compounds and mixtures thereof and; between about 30 and about 99 weight percent of a solvents selected from the group consisting of aliphatic solvents, ketones, aromatic solvents, ester solvents, chlorinated solvents and mixtures thereof.

7. A method of cleaning and restoring electrical properties to electrical cables according to claim 1 wherein said formulation comprises about 4 weight percent of an alkanolamine ester, about 4 weight percent of a silicone oil and about 92 weight percent of a mineral spirit having a flash point above about 140° F.

* * * * *